Jan. 16, 1968    N. C. LANGE    3,363,789
BOAT TRAILER
Filed Oct. 15, 1965    2 Sheets-Sheet 1
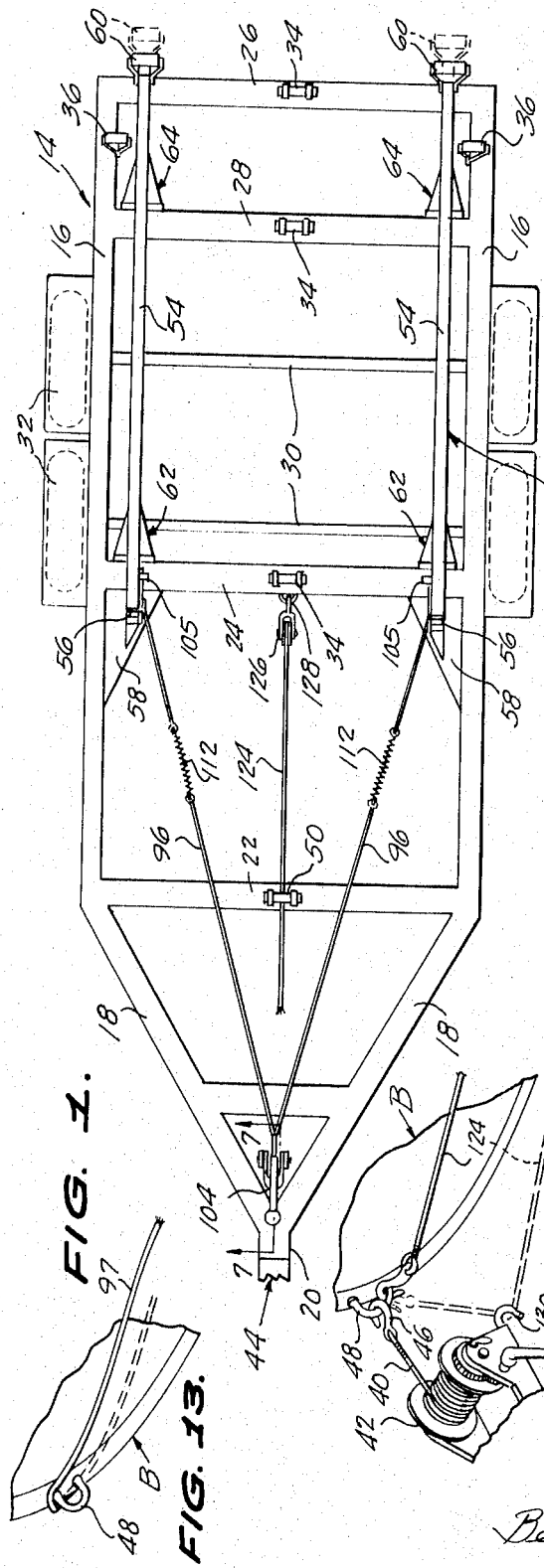
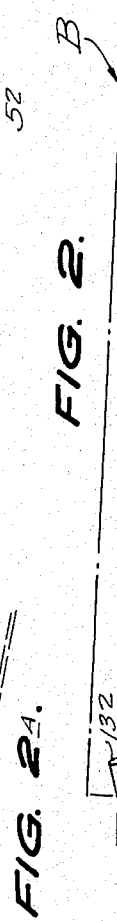
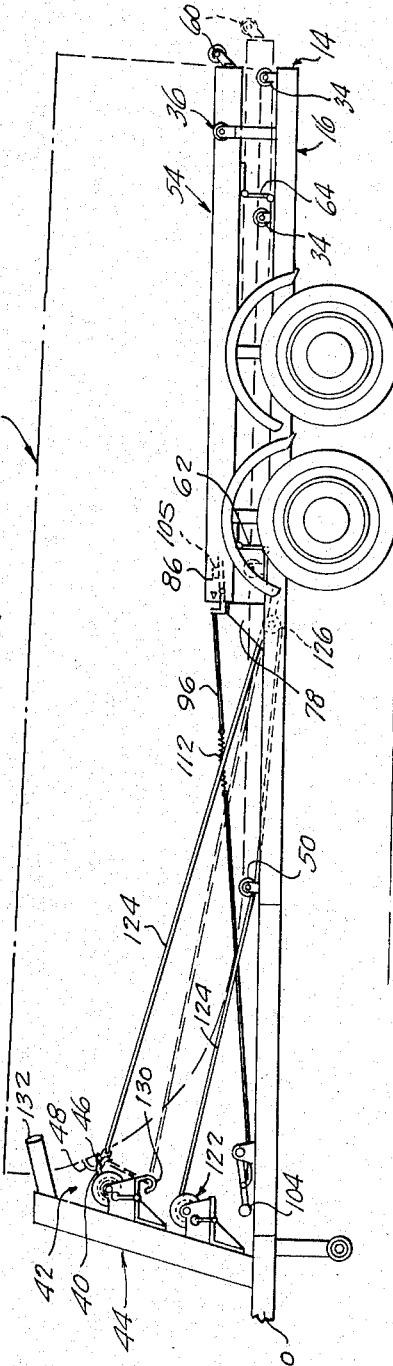
INVENTOR.
NORMAN C. LANGE,
BY
Berman, Davidson & Berman
ATTORNEYS.

Jan. 16, 1968      N. C. LANGE      3,363,789
BOAT TRAILER
Filed Oct. 15, 1965      2 Sheets-Sheet 2
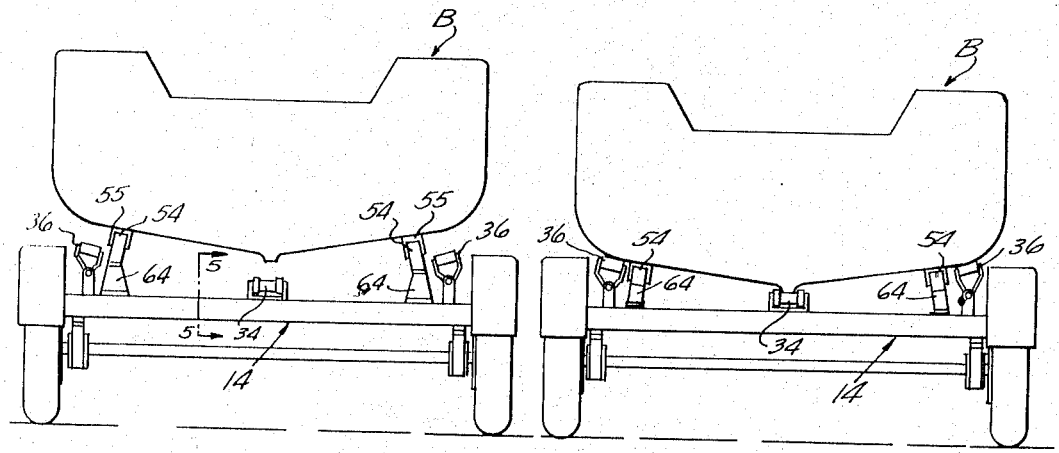
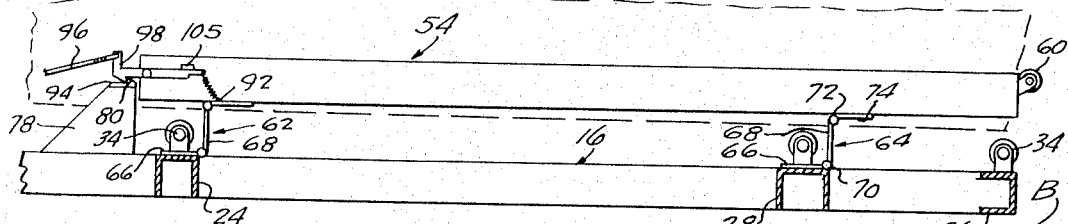
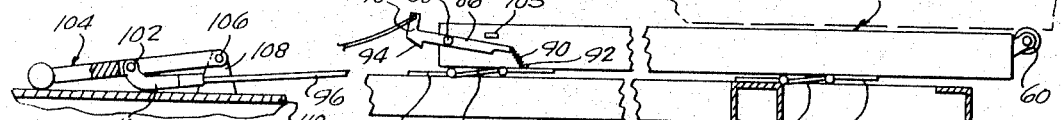
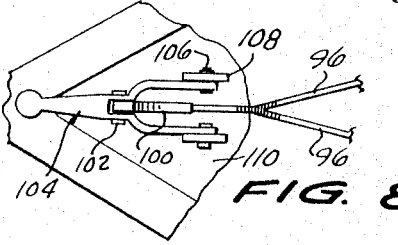
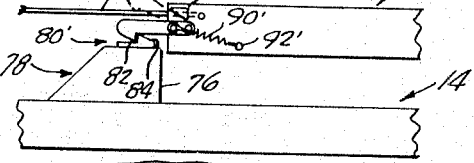
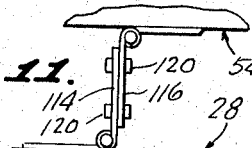
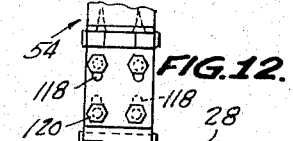
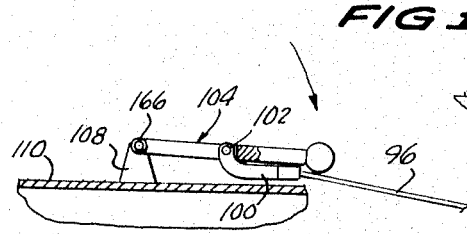
INVENTOR.
NORMAN C. LANGE,
BY
Berman, Davidson & Berman
ATTORNEYS.

3,363,789
BOAT TRAILER
Norman C. Lange, 7621 SE. 34th St.,
Mercer Island, Wash. 98040
Filed Oct. 15, 1965, Ser. No. 496,315
13 Claims. (Cl. 214—517)

ABSTRACT OF THE DISCLOSURE

A boat trailer having keel rolls, side rolls and a bunk assembly, said bunk assembly being engageable by forward motion of the boat relative to the trailer and upon such occasion acting to raise the boat out of contact with said side rolls and at least some of said keel rolls.

---

This invention relates to a trailer, especially, but not exclusively, for loading, carrying and unloading boats, the trailer being adapted also for handling other objects, such as logs, and lumber, or the like.

The primary object of the invention is the provision of a trailer of the kind indicated, which utilizes the friction between a boat, or the like, as it is winched toward final forward position on the bunk assembly of the trailer, to automatically-elevate the boat, or the like, off the conventional rollers of the trailer, without the intervention of another or supplemental elevating device.

Another object of the invention is the provision of a generally superior, more easily-operated, safer, and more practical and reliable device of the kind indicated, which is of simplified and more durable construction, the said device involving smaller than usual number of parts, which are less complicated and longer lasting.

A further object of the invention is the provision of a device of the character indicated above wherein a substantially conventional assembly of loading and unloading rollers, including an "on" winch, is supplemented by a bunk assembly, upon which the boat or other load is supported and is more securely-positioned, while being transported, the bunk assembly being articulated to the trailer chassis in such a way that, as the boat is loaded on the trailer, the bunk assembly is moved forwardly and upwardly relative to the chassis by the friction between the load and the bunk assembly, so that the bunk assembly bears the weight of the load, latching means being provided for positively latching the bunk assembly in the elevated forward position, as this position is attained.

A still further object of the invention is the provision, in a device of the character indicated above, of an "off" winch which is adapted to be utilized to assist manual or gravitational rearward and downward movement of the bunk assembly, once the latter has been unlatched, toward its depressed unloading position, the "off" winch cable also being adapted to be tethered to the trailer chassis for the purpose of assisting in the retention of the boat and the bunk assembly in a forward and elevated position.

FIGURE 1 is a top plan view of the device of the invention shown, showing the bunk assembly in its elevated forward load-bearing position;

FIGURE 2 is a side elevation of FIGURE 1, a boat, in phantom lines, being shown in carried position on the bunk assembly, with the "on" winch cable in boat-holding position, in full lines, and the "off" winch cable in alternative positions, in full and in phantom lines;

FIGURE 2a is an enlarged fragmentary perspective view, showing alternative arrangements of winch cables and their hooks, relative to an eye on a boat, and a hook on a winch;

FIGURE 3 is a rear elevation of FIG. 2;

FIGURE 4 is a view, like FIGURE 3, showing the bunk assembly in its depressed rearward position, wherein the boat rests upon the loading and unloading assembly;

FIGURE 5 is an enlarged fragmentary, vertical, longitudinal section, taken on the line 5—5 of FIGURE 3, showing the bunk assembly latched;

FIGURE 6 is a view, like FIGURE 5, showing the bunk assembly in its depressed rearward position and unlatched;

FIGURE 7 is an enlarged fragmentary, vertical, longitudinal section taken on the line 7—7 of FIGURE 1, showing the toggle lever of the latch in over-center latch-holding position;

FIGURE 8 is a fragmentary, top plan view of FIGURE 7;

FIGURE 9 is a view, like FIGURE 7, showing the lever in latch-releasing position;

FIGURE 10 is a fragmentary side elevation, showing another and automatically-operated latch for the bunk assembly, the latch being shown in engaged and disengaged positions, in full and in phantom lines, respectively;

FIGURE 11 is a fragmentary side elevation, showing a height-adjustable form of hinge assembly for the bunk assembly;

FIGURE 12 is an end elevation of FIGURE 11; and

FIGURE 13 is a fragmentary perspective view, showing employment of a bunk rope.

Referring in detail to the drawings, and first, to FIGURES 1 through 9 thereof, the illustrated trailer comprises a horizontal chassis 14, having parallel side members 16 which terminate, at their forward ends, in forwardly-convergent portions 18 which meet in a draft tongue 20. A front cross-member 22 extends between the forward ends of the side members 16, as do longitudinally-spaced main intermediate cross-member 24, a rear cross-member 26, and a secondary intermediate cross-member 28, the last being located close to the rear cross-member 26.

Longitudinally-spaced transverse axles 30 are suitably secured in support of the chassis 14, between the main intermediate member 24 and the secondary cross-member 28, and carry wheels 32.

The cross-members 24, 26 and 28 have single centered and longitudinally-aligned conventional grooved loading and unloading keel rollers 34 upstanding thereon, and single upstanding, inwardly-angled outrigger rollers 36 are located on the chassis side members 16, between the cross-members 26 and 28. A boat B or other load, being loaded or unloaded, normally rests upon and rolls longitudinally relative to the chassis 14 on the rollers 34, 36, and a front keel roller 50, aligned with the rollers 34 and 36, and is handled relative thereto by a cable 40 wound on a conventional "on" ratchet winch 42 mounted on the upper part of a standard 44 rising from the forward end of the chassis 14. The "on" winch cable 40 is provided with a hook 46 adapted to be engaged through an eye 48 on the forward end of the boat B in a well-known manner.

A bunk assembly 52 comprises a pair of parallel spaced longitudinally-elongated bunks 54 which overlie the chassis 14, and are located near to and are spaced inwardly from the chassis side member 16 and the outrigger rollers 36. The bunks 54 are preferably slightly longer than the distance between the rear chassis cross-member 26 and the main intermediate cross-member 24, and have forward ends 56 which overlie horizontal gusset plates 58, which extend inwardly from the chassis side members and forwardly from the main intermediate cross-member 24.

On and extending from the rear ends of the bunks 54 are rearwardly and upwardly inwardly-canted rollers 60, which, as indicated in FIGURE 2, have their upper ends located above the bunks 54.

The bunks 54, as an assembly 52, are articulated to the chassis 14, by means of similar front and rear hinge assemblies 62, 64, mounted on the main intermediate and the secondary intermediate cross-members 24 and 28, respectively. Each of the hinge assemblies comprises, as shown in FIGURES 5 and 6, a horizontal leaf 66 fixed upon the related cross-member, and intermediate leaf 68 hinged, as indicated at 70, at its lower end to the rear edge of the front leaf 66, and hinged, as indicated at 72, at its upper edge to the front edge of a rear leaf 74, the leaf 74 being fixed to the underside of a bunk 54. As also shown in FIGURES 5 and 6, in the elevated forward load-bearing position of the bunk assembly 52, the intermediate hinge leafs 68 are in perpendicular positions, whereas, in the depressed rearward position of the assembly, the intermediate leafs 68 are disposed in rearward horizontal positions, relative to the related cross-members. The tops of the bunks 54 are preferably covered with suitable carpeting 55 of the like, in the interest of providing frictional and non-injurious contacts with the underside of a boat B resting thereon. The elevation of the rear rollers 60 of the bunks 54 above the tops of the bunks provide for easy loading and unloading of a boat B thereon.

As a boat B is winched forwardly onto the bunk assembly 52, the friction therebetween moves the assembly forwardly so that the hinge assemblies 62, 64 produce forward and upward movements of the boat B, and this assembly relative to the loading and unloading assembly rollers 34, 36, and 50 until the forward ends 56 of the bunks 54 engage the rear ends 76 of fixed upstanding stops 78 on the gusset plates 58. On the tops of the stops 78 are fixed upstanding latch detents 80 having perpendicular forward faces 82, and rearwardly-declining cam surfaces 84 which are aligned with normally horizontal latch levers 86 which are pivoted, intermediate their ends, as indicated at 88, on the inward sides of the bunks 54.

The latch levers 86 are biased rearwardly and downwardly by means of springs 90 stretched between the rear ends of the levers at points 92 on the bunks 54 below the levers. At their forward ends the latch levers 86 are formed with downwardly-extending cam hooks 94 adapted to engage the forward faces 82 of the detents 80, as shown in FIGURE 5, by reason of forward pulls exerted by cables 96 secured, at their rear ends, to upstanding arms 98 on the latch levers 86, and secured, at their forward ends, to the rear ends of a J-shaped toggle arm 100 which is pivoted, as indicated at 102, at its elevated forward end to intermediate parts of a U-shaped toggle lever 104. The toggle lever 104 is pivoted at one end, as indicated at 106, on upstanding brackets 108, fixed on centered forward end portions 110 of the chassis 14. The linear springs 112 are incorporated in the cables 96, to serve to increase and to cushion the over-center locking and releasing action of the toggle lever 104 and the latch lever 86, the latter being maintained in its latching position in a forwardly-depressed position of the toggle lever 104, as shown in FIGURES 7 and 8; and being released, in its rearwardly-depressed position, as shown in FIGURE 9. The latch lever stop lugs 105 above the levers 86 project inwardly from the inner sides of the bunks 54. The springs 112 also permit the toggle lever 104 to be moved to its forward position, before the bunk assembly has reached its full forward position, so that the bunk assembly can be cocked while the load is still in contact with the rollers 60.

Another self-acting and manually-releasable latching arrangement for the bunk assembly 52 is shown in FIGURES 10 and 13, which comprises a detent 80' like the detent 80 of FIGURES 5 and 6, and a spring-pressed latch lever 105' which is devoid of a cable-connecting arm 98, and is not connected to a toggle lever-operated cable. In this case, a bunk rope 97, secured to the forward end of the bunks 54, is provided for raising the bunk assembly 52. The forward motion of the boat is used to initially cock the bunk assemblies 52. As the boat approaches its final position, about one-foot from the stop 132, the bunk ropes 97 are hooked over the boat eye 48. Continued forward motion of the boat brings the bunks into contact with the bottom of the boat. Further forward motion and friction between the bunks and the boat cocks and locks the bunks, as shown in FIGURE 10. The numerals 86', 90', 92', and 105' designate elements corresponding to similarly numbered elements of FIGURE 6. The latch member 86' has the spring 90' attached thereto between its latching hook, its point of pivot to member 54. Until the boat moves relative to members 54, the latch member 86' occupies the dotted line position in FIGURE 10. The boat and members 54 move together until the stop 76 is reached. Further forward movement of the boat then depresses latch member 86' to the full line position of FIGURE 10.

FIGURES 11 and 12 show, in contrast to FIGURES 5 and 6, vertically-adjustable hinge assemblies for the bunk assembly 52, which provides for adjusting the height of the bunk assembly 52, relative to the loading and unloading assembly and the chassis 14, in the elevated forward position of the bunk assembly 52. The adjustable hinge assemblies differ from the fixed hinge assemblies of FIGURES 5 and 6 only in that the intermediate hinge leafs are composed of two laterally-engaged plates 114, 116, rather than one plate, which are formed with vertically-elongated adjustment slots 118, through which bolts 120 extend.

For assisting and controlling rearward and downward movement of the bunk assembly 52, which may be initiated by gravity or manually, the above-described device includes an "off" ratchet winch 122 which is mounted on the standard below the "on" winch 42, a cable 124 being wound on the "off" winch 122, and extends rearwardly beneath the front keel roller 50, and is trained under a pulley 126, secured, as indicated at 128, to the main intermediate chassis cross-member 24.

In use and operation, the boat B is loaded onto the above-described device, by initially engaging the forward part of the boat B on the outrigger rollers 36 and the keel rollers 34, and then onto the rear rollers 60 on the bunks 54. The cable 40 of the "on" winch 42 is then secured to the boat eye 48 and the winch 42 operated, so as to pull the boat B forwardly. As the boat approaches its final forward position on the device, the toggle lever 104 is swung forwardly and downwardly, so as to tension the cables 96 and their springs 112. The bunk assemblies 52 are thereby swung upwardly and forwardly into contact with the bottom of the boat B. Continued operation of the "on" winch 42 pulls the boat forwardly, and the friction developed between the bunk assemblies 52 and the bottom of the boat causes the bunk assemblies 52 to continue forwardly and upwardly, thereby raising the boat from the keel and outrigger rollers 34, 36.

In order to prevent excessive forward movement of the bunks 54 in the initial stage of the loading of the boat B on the device, the engagement of the bottom of the boat on the rear bunk rollers 60 serves to prevent the bunks 54 from moving too far upward and too far forward. Thus, the rollers 60 serve to hold the bunks 54 away from the bottom of the boat B until the boat has nearly reached its predetermined final position. When the transom of the boat B passes forwardly beyond the rollers 60, the continued forward movement of the boat, with the boat bottom then in full frictional and load-bearing contact with the bunks 54, full forward and upward movement of the bunks to their final positions is produced, in engagement with the stops 78, whereat, the latching of the bunks takes place.

The "off" winch cable 124, as shown in FIGURES 2 and 2a, is to be hooked around the hook 130 and then into the eye 48 of the boat B, only when transporting the boat. By tightening the "off" winch cable the boat is pulled to and is held against the forward stop 132.

When it is desired to winch the boat B off the device, and thereby cause the bunks 54 to move rearwardly and downwardly, because of friction of the boat on the bunks and rearward movement of the boat, it is necessary to unhook the "on" winch cable 40 from the boat eye 48. The "off" winch cable is disengaged from the hook 130, while keeping it engaged with the boat eye 48. Toggle lever 104 is disengaged. The "off" winch 122 is operated to tighten the "off" winch line, so that there is a direct rearward pull between the pulley 126 and the boat eye 48, by the "off" winch line 124. Additional tightening of the "off" winch cable 124 will then cause the boat B to move rearwardly. The "on" winch line 40 is used only to pull the boat onto the trailer and hold it there. The "off" winch cable 124 serves two purposes, that is, to start pulling the boat off the trailer, or when transporting the boat, to hold the boat in its forward position, through the use of the hook 130.

What is claimed is:

1. A trailer comprising a horizontal wheeled chassis, longitudinally-aligned and longitudinally-spaced keel roller means on the chassis, outrigger roller means on the chassis outside of the keel roller means, a bunk assembly overlying the chassis between the outrigger roller means and normally resting upon the chassis, means articulating the bunk assembly upon the chassis forwardly and upwardly relative to said chassis, means for pulling a boat onto the chassis, said articulating means being operative by frictional engagement with the boat to cause forward movement of the boat relative to said chassis to elevate the bunk assembly above the keel roller means and the outrigger roller means, and releasable latch means acting between the chassis and the bunk assembly for retaining the bunk assembly in its elevated forward position.

2. A trailer according to claim 1, wherein said bunk assembly comprises a pair of laterally-spaced bunks having forward and rear ends, said bunks being spaced at opposite sides of the keel roller means, said bunks having rollers on their rear ends extending at all times above the tops of the bunks.

3. A trailer according to claim 1, wherein said bunk assembly comprises a pair of laterally-spaced bunks having forward and rear ends, said bunks being spaced at opposite sides of the keel roller means, said articulating means comprising longitudinally-spaced forward and rear hinge assemblies fixed to and extending between the chassis and the bunks.

4. A trailer according to claim 3, wherein said hinge assemblies are vertically-adjustable to predetermine the height above the chassis to be assumed by the bunk assembly in its elevated position.

5. A trailer according to claim 1, wherein said latch means comprises upstanding stop means on the chassis with which the forward end of the bunk assembly is adapted to engage in its elevated position, latch detent means on the stop means, spring-retracted latch lever means pivoted on the bunk assembly, and over-center lever means pivoted on the chassis and operatively-connected to the latch lever means for moving and holding the latch lever means engaged with the detent means.

6. A trailer according to claim 1, wherein said chassis has an upstanding standard spaced forwardly from the bunk assembly, an "on" winch mounted on and a hook fixed to said standard, said "on" winch having cable means adapted to be secured to a boat to be pulled onto the chassis rollers and the bunk assembly, prior to elevation of the bunk assembly relative to the chassis, an "off" winch mounted on said standard and having cable means adapted to be, at times, secured to a boat and to the said hook.

7. A trailer comprising a chassis, a boat-supporting bunk assembly mounted upon the chassis and normally resting thereon, means on the bunk assembly providing for friction between the bunk assembly and a boat bearing thereon, means for pulling a boat onto the chassis, means articulating the bunk assembly to the chassis and providing for forward and upward movement of the bunk assembly relative to the chassis between a depressed rearward starting position and an elevated boat-carrying position, stop means for stopping the bunk assembly in its boat-carrying position, releasable latch means for holding the bunk assembly in its boat-carrying position, said first named means adapted to act between a boat and the bunk assembly when pulling a boat forwardly onto the bunk assembly, for moving the assembly forwardly and upwardly to its boat-carrying position.

8. A trailer assembly according to claim 7, wherein said trailer includes second means located between a boat on the keel roller and outrigger roller means and adapted to act between the bunks and the chassis for holding the bunk assembly and a boat thereon in the boat-carrying position of the bunk assembly.

9. A trailer assembly according to claim 8, wherein said second means being adapted for moving the bunk assembly and a boat thereon rearwardly and downwardly relative to the chassis to put the bunk assembly in its starting position for unloading a boat from the bunk assembly.

10. A trailer comprising a chassis, a boat-supporting bunk assembly mounted upon the chassis and normally resting thereon, means on the bunk assembly providing for friction between the bunk assembly and a boat bearing thereon, means for pulling a boat onto the chassis, means articulating the bunk assembly to the chassis and providing for forward and upward movement of the bunk assembly relative to the chassis between a depressed rearward starting position and an elevated boat-carrying position, stop means for stopping the bunk assembly in its boat-carrying position, releasable latch means for holding the bunk assembly in its boat-carrying position, said first named means adapted to act between a boat on the bunk assembly when pulling a boat forwardly onto the bunk assembly and the assembly forwardly and upwardly to its boat-carrying position, said chassis having roller means upstanding thereon upon which a boat can rest in the depressed starting position of the bunk assembly.

11. A trailer comprising a chassis, a boat-bearing bunk assembly supportably-articulated on the chassis to swing from a rearward depressed position to an elevated forward position, means on the bunk assembly adapted to produce friction between the bottom of a boat and the bunk assembly as a boat is placed on the bunk assembly in the depressed position of the bunk assembly as the bunk assembly is moved forwardly and upwardly to a cocked position, first means for pulling a boat onto the bunk assembly and moving the combination of boat and bunk assembly forwardly and upwardly, said first means comprising an "on" ratchet winch mounted on the chassis forwardly of the bunk assembly, said "on" winch comprising a cable having a hook adapted to be engaged in an eye in the forward end of a boat, wherein second means are provided for pulling the boat and bunk combination rearwardly to the depressed position of the combination, said second means comprising an "off" ratchet winch comprising a cable having a hook adapted to be engaged in the boat eye, with the "on" cable hook disengaged from the boat eye, the chassis having a pulley spaced rearwardly from the "off" winch under which the "off" winch cable is trained.

12. A trailer according to claim 11, including a fixed hook on the chassis disposed between the "on" winch and the "off" winch, the cable of the "off" winch being adapted, at times, to be engaged around the fixed hook with its hook engaged in the eye of the boat, while the hook of the "on" winch is engaged in the eye of the boat, for supplementing the action of the "on" winch in holding the boat and bunk combination in their elevated cocked forward positions.

13. A trailer according to claim 1, wherein said bunk assembly comprises bunk rope means at the forward end thereof, said bunk rope means being engageable at will around the forward end of a boat present on the keel roller and outrigger roller means.

References Cited

UNITED STATES PATENTS

| | | | |
|---|---|---|---|
| 2,865,522 | 12/1958 | Peterson et al. | 214—84 |
| 2,901,138 | 8/1959 | Whalen | 214—506 |
| 3,104,770 | 9/1963 | Calkins et al. | 214—505 X |
| 3,120,317 | 2/1964 | Pardonnet | 214—512 |
| 3,203,563 | 8/1965 | Blatchford | 214—84 |

GERALD M. FORLENZA, *Primary Examiner.*

ALBERT J. MAKAY, *Examiner.*